June 2, 1970 J. J. A. ROBILLARD 3,515,554

DIAZO TYPE PAPER AND NEW HIGH SPEED DIAZO REPRODUCTION PROCESS

Filed July 25, 1966

JEAN J. A. ROBILLARD
INVENTOR

BY Darby & Darby
ATTORNEYS

United States Patent Office 3,515,554
Patented June 2, 1970

3,515,554

DIAZO TYPE PAPER AND NEW HIGH SPEED DIAZO REPRODUCTION PROCESS

Jean J. A. Robillard, Paris, France, assignor to U.S. Philips Corporation, New York, N.Y., a corporation of Delaware Filed July 25, 1966, Ser. No. 567,483
Int. Cl. G03c *1/54, 5/34*
U.S. Cl. 96—49 15 Claims

ABSTRACT OF THE DISCLOSURE

A high speed diazo reproduction process is provided which comprises exposing an image pattern and a diazo sheet to a radiation in the visible range of the spectrum, the diazo sheet containing a diazonium compound, a coupler and a radiation sensitive promoter which triggers a chain-reaction type decomposition of the diazonium compound exposed to the light source, and developing the latent image by shifting the pH of the diazo paper toward the basic region. A novel diazo sheet is also described.

The present invention relates to a new high speed diazo reproduction process for making positive diazo type copies with high image quality and to a radiation-sensitive diazo type paper suitable for carrying the process of the present invention.

More particularly, the present invention is concerned with a diazo reproduction process employing a promoter in the diazo type composition to increase the speed of the diazo process and reduce considerably the exposure time and the power of the light source necessary for the exposure step of the reproduction process.

The conventional diazo process is based on the decomposition of a diazonium salt under an intense UV light followed by a development of the unexposed diazonium salt, which involves a coupling reaction with one or more couplers existing in the sensitive emulsion. The development is obtained by a shift in pH created by exposure of the material to ammonia vapors or the presence of a material in the diazo paper which decomposes to produce ammonia.

In the conventional diazo processes, the quantum yield which is a measure of the speed of the process is generally smaller than unity and as a result copying machines using the diazo process require long exposure time and powerful light sources, normally UV light. The diazonium salts used in the conventional diazo processes are relatively stable and, therefore, the photodecomposition does not lead to a chain reaction of type which would be favorable for high quantum yield. There also exist more unstable diazonium salts which would lead to a chain reaction type decomposition triggered by very small energy, but the use of these diazonium salts leaves much to be desired and would not be practical for convenient handling and storage of the diazo reproduction paper due to their instability.

Accordingly, it is an object of the present invention to provide a high speed diazo reproduction process employing relatively stable diazonium compounds.

Another object of the present invention is to provide a high speed diazo reproduction process which considerably reduces the exposure time and the power of the light source necessary for the exposure step of the process.

A further object of the present invention is to provide a high speed diazo reproduction process which employs a promoter in the diazo copy sheet which can trigger a chain reaction type decomposition of a stable diazonium compound.

Yet a further object of the present invention is to provide a radiation-sensitive diazo type sheet material suitable for use in carrying out the process of the present invention.

Figure 1:
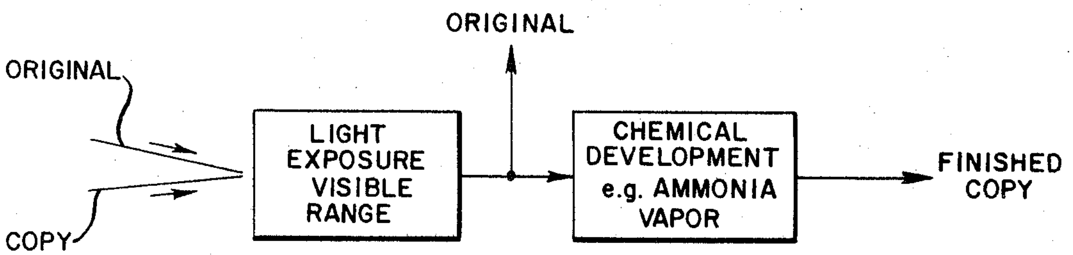
Figure 2:
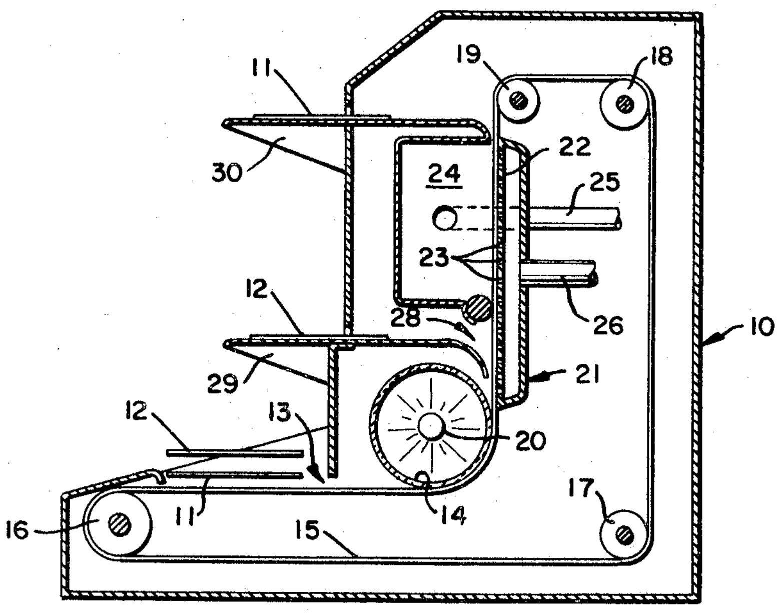

This and other objects and advantages of the present invention will become apparent from the following detailed description when taken in conjunction with the appended drawing wherein:

FIG. 1 is a flow diagram illustrating the steps of the process of the present invention; and FIG. 2 is a schematic diagram of an apparatus suitable for carrying out the process of the present invention.

According to the present invention, it has been found that the presence of a small quantity of a so-called "promoter"—a compound containing at least one azide group—can trigger a chain reaction type decomposition of a stable diazonium compound through an electron exchange process initiated by the absorption of a quantum of light by the promoter. This chain reaction type decomposition is highly favorable for a high quantum yield which increases the speed of the diazo process and reduces the exposure time and the power of the light source necessary to decompose the diazonium compound during the exposure step.

The azide promoter is generally an isoelectronic compound to the diazonium compound and the quantity of the azide compound necessary to promote the decomposition is of the order of about 1 part by weight per hundred parts by weight of diazonium compound. However, this quantity can vary according to the desired characteristics of the diazo paper.

In organic azide compounds, the organic radical is bonded to one end of the azide group, and the N—N bond distances in the entire group are unequal. For example, in the case of cyanuric triazide which is a typical polyazide compound suitable for employment in the process of the present invention, the bond lengths are:

$$\mathrm{C{-}N\overset{1.26}{-}N\overset{1.11}{-}N}$$

and a similar disymmetry exists for other azide compounds. The decomposition of the azides by light develops by a free radical mechanism, and the initial step of this decomposition involves fission of the longest N—N bond, a mechanism which is similar to the decomposition of the diazonium salt. This mechanism is as follows:

$$\mathrm{R{-}N{-}N{-}N \rightarrow R{-}N + N_2}$$

The azide compounds have a quantum mechanical compatability with diazonium compounds and have the ability to decompose by a free radical mechanism, thus producing very highly reactive radicals which enhance a chain reaction type decomposition of the diazonium compound. Each light activated promoter molecule is responsible for decomposition of many diazonium molecules thus enhancing the "speed" of the photographic process.

Another advantage in employing the promoters of the present invention is that it permits the shifting of the spectral response of the diazo composition into the visible range and thereby avoids the use of expensive UV light sources in the exposure step. This spectral response in the visible range may be accomplished by the selection of an azide promoter which has an absorption band in the visible range. This permits the use of radiation in the visible range to decompose the azide promoter in accordance with the mechanism described above, and the decomposition of the azide by light will trigger a chain reaction type decomposition of the stable diazonium compound.

Further, if desired, the promoters of the present invention can be sensitized with an organic dye which will shift their spectral response into the visible range and also increase the range of their sensitivity to the radiation source.

The shifting of the spectral response using one or more organic dyes may be carried out in accordance with the techniques known in the art. Suitable organic dyes include acridine dyes, xanthrene dyes, diphenylmethane dyes, stilbene dyes, thiazole dyes, quinoline dyes, azo dyes, etc. Specific dyes include Phosphine R (46045), Rose Bengal (45435), Stilbene Yellow G (40000), Azo Scarlet Y (17755), Calconine Chinaline Yellow P (47035), etc. The dye identification numbers are taken from second volume of the Color Index (1956).

As illustrated by FIG. 1, the process of the present invention is carried out as follows:

The original to be reproduced and the diazo type paper are first exposed to a light source, e.g., in the visible range, which will trigger the decomposition of the stable diazo compound in those portions expose to the light source. This decomposition and exposure time is substantially smaller than heretofore required in the conventional diazo processes because the presence of an azide promoter triggers a chain type decomposition of the diazonium compound in those portions exposed to the light source. Following exposure to the light source development is accomplished, according to the techniques known in the art such as, for example, exposure of the diazo paper to ammonia vapors. Ammonia vapors can be liberated from a developer medium which consists of a suitable ammonia compound such as ammonium carbonate, ammonium bicarbonate, ammonium carbamate, etc. Other ammonium compounds can also be employed as long as they will decompose freely at temperatures slightly elevated above room temperature with the production of free ammonia gas. The ammonia vapors which contact the diazo paper bring about a shift in pH in the diazo paper toward the basic region thereby triggering the coupling of one or more of the couplers in the diazo paper with the diazonium compound which were not decomposed during exposure. This coupling reaction results in a positive reproduction of the original on the diazo type paper.

While the use of ammonia vapors is one manner in which the development step may be carried out, any of the other conventional techniques known in the art for development of the positive image in the diazo process are suitable. For example, a compound such as thiourea, thiosemicarbazide or guanidine carbonate may be incorporated in the diazo paper which upon thermal decomposition produces ammonia in the paper itself and, hence, brings about a shift in pH toward the basic region. Conventional diazo type development techniques that may be employed in the process of the present invention include any of the dry development, semi-wet development, etc. processes known in the art.

Azide promoters which are suitable for the present invention include triphenylmethyl azide; trinitrotriazidobenzene; 6 chloro-quinoline-quinone - (3,4)-diazide-3; 7-phenyl-quinoline-quinone - (3,4)-diazide-3; naphthoquinone-1,2 diazide-(2)-phenyl sulfone (4); and N-benzoyl-N'-naphthoquinone - (1,2) - diazide-(2,5)-sulfonyl-hydrazine. However other azide and polyazide compounds may also be employed in the invention.

The diazo compounds suitable for use in the present invention include any of the usual diazo compounds known in the art. The diazo compounds may be used as such or in the form of their stabilized double salts such as a diazonium zinc chloride, cadmium chloride or stannous chloride double salt.

Representative of specific diazo compounds which may be suitably employed in the present invention include 1-diazo-4-diethylaminobenzene; 1-diazo-2,5-diethoxybenzoylaminobenzene; 1-diazo-2,5-dibutoxybenzoylaminobenzene; 1-diazo-4-tolylmercapto-2,5-diethoxybenzene; 1-diazo-2,5-dimethoxy-1-p-tolylmercaptobenzene; 1 - diazo-3-ethoxy-4-diethylaminobenzene; 1-diazo-4-(N-hydroxyethyl-N-methyl)aminobenzene; 1-diazo-4-n-propylamino-3-n-propoxybenzene; p-diazo-diphenylamine; 1-diazo-2-chloro-4-(dihydroxyethyl)aminobenzene; 1-diazo - 4 - dimethylaminobenzene; 1 - diazo-4-dihydroxypropylaminobenzene; 1-diazo-3-methyl-4-dimethylaminobenzene; 1-diazo-2-carboxy - 4 - dimethylaminobenzene; and 1-diazo-4-diamylaminobenzene.

Representative of the class of aromatic diazo compounds that may be employed in the process of the present invention are compounds of the following formula:

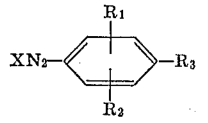

X represents an anion $R_1$ and $R_2$ are the same or different and represent H, alkyl alkoxy, alkylmercapto, aryl, aralkyl, halo, carboxy and aryloxy groups $R_3$ represents

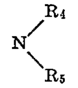

O—$R_6$, S—$R_6$ and diarylamino;

$R_4$ and $R_5$ are the same or different and represent hydrogen alkyl, aryl, aryloxy, hydroxyalkyl, aralkyl, alkylacyl and aroyl groups; $R_6$ represents alkyl, aryl, aralkyl, alkaryl.

The diazo composition of the present invention includes any of the usual couplers well known in the art such as, for example, phloroglucinol; 1,3,5-trihydroxy-2-methylbenzene; 1,5-dihydroxy - 2 - methylbenzene; o-hydroxydiphenyl; 1-hydroxynaphthalene; cyanacetanilide; 4-(acetoacetamido)benzene sulfonamide; resorcinol monoacetate; 1-acetylamino-2-naphthol-5-sulfonic acid; p-methyl-N-phenylpyrazolone; 3-methyl-pyrazolone; 2,5-xylenol; thiobarbituric acid; 3,5-dihydroxytoluene; 1,5-dihydroxynaphthalene; acetyl acetanilide; and 2,3-dihydroxynaphthalene. A list of other suitable couplers may be found in the article by Van de Grirten, Photographic Journal, volume 92B (1952).

The diazo composition of the present invention may contain in addition to the diazo compound and the coupling agent(s) the usual adjuncts. For example, a hygroscopic agent such as glycerine, ethylene glycol or dextrin can be suitably employed in the diazo composition. There may also be included stabilizing agents such as thiourea and its derivatives, naphthalene trisulfonic acid, and the like, to prevent darkening of phenolic residues. Also included in the diazo composition is a stabilizing acid for retarding premature coupling such as citric acid, boric acid, tartaric acid, oxalic acid, acetic acid, etc. Additional adjuncts that may be included in the composition are: a spreading agent, e.g. Saponin, Igepal, Tergitol, etc. a metal salt for intensification of the image such as zinc chloride, nickel sulfate, aluminum sulfate or titanium ammonium fluoride.

The base material upon which the diazo type composition is coated may be a sheet film or web-forming material such as cotton, linen, paper, etc. Any suitable coating process may be utilized. For example, a conventional knife coating machine may be used to coat the layer of the material onto a base. The coating can also be performed with other usual methods such as wire rod, kiss coating, air knife, etc.

The general procedure for preparing the diazo type base material is as follows: coating on a suitable base material, a composition comprising one or more materials which improve density e.g. Darex (a polyvinylacetate emulsion), Nalcoag 1035 (a colloidal silica), Pliolite S-5 (styrene-butadiene copolymer) etc. dissolved in an aqueous solution of water and a stabilizing acid for retarding premature coupling, e.g. citric acid, etc. This composition is dried and the coated base material is then coated with a diazo composition comprising the selected diazo compound, or corresponding diazonium salt, the promoter, one or more couplers and the usual adjuncts.

Specific illustrative but non-limiting examples of the diazo compositions useful in the process of the present invention are as follows.

EXAMPLE 1

White base paper of 80 g./m.$^2$ is first coated with a composition comprising:

Darex—42 ml.
Nalcoag—39 ml.
Citric acid—1.3 g.
Water—140 ml.

The base paper is given the following diazo coat comprising:

Water—150 ml.
Glycerine—11.4 g.
Thiourea—37.5 g.
Zinc chloride—15.0 g.
Phloroglucinol—2.1 g.
2,3-dihydroxynaphthalene—5.7 g.
Zinc chloride double salt of 1-diazo-4-diethylaminobenzene—5.1 g.
Cyanuric triazide—0.05 g.
Citric acid—6.0 g.
Saponin—0.25 g.

This diazo coating is dried. While the order of mixing the ingredients of the diazo-coat is not critical, the ingredients of the diazo-coat are preferably dissolved in water in the following order: (a) diazo salt, (b) citric acid, (c) saponin, (d) zinc chloride, (e) thiourea, (f) glycerine, (g) couplers and (h) cyanuric triazide.

EXAMPLE 2

A diazo-coat was prepared as in Example 1, except that 1.2 g. of triphenyl methylazide was substituted for cyanuric triazide.

EXAMPLE 3

A diazo-coat was prepared as in Example 1 except that 0.08 g. of trinitrotriazidobenzene was substituted for cyanuric triazide.

The diazo process of the present invention can be carried out in a conventional diazo copy apparatus where the UV light source for the exposure step has been replaced by a light source emitting radiation in the visible range.

The diazo type process of the present invention may also be utilized in an apparatus such as that illustrated in FIG. 2, for example.

In FIG. 2, the apparatus 10 comprises an elongated opening 13 that receives the diazo paper 11 and the original 12 to be reproduced. The original 12 and diazo paper 11 are arranged in an overlying relationship. The sheets 11 and 12 are inserted in the opening 13 and are drawn underneath the exposure roller 14 by endless transfer belt 15 which is carried by rollers 16, 17, 18 and 19. The exposure roller 14 furnishes the light to decompose the diazo compound in the areas of the diazo paper 11 exposed to the light. The exposure roller 14 may be formed of a plastic cylinder or light transmitting glass within which there is positioned a fluorescent light emitting tube 20.

After the original 12 and diazo paper 11 have passed underneath exposure roller 14, the original 12 is separated from the diazo paper by use of a chamber 21 which is under sub-atmospheric pressure by virtue of its communication with a vacuum pump (not shown) through conduit 26. The front wall 22 of chamber 21 is provided with apertures 23. Accordingly, as the diazo paper 11 moves upwardly in overlying relationship with the front wall 22 of chamber 23, it will adhere thereto under the influence of sub-atmospheric pressure, this sub-atmosphere being communicated to the rear surface of the diazo paper 11 by means of apertures 23 and the transfer belt 15 which is porous. The sub-atmosphere is blocked from the original 12 because of the impervious nature of the diazo paper 11 and hence diazo paper 11 will separate from the original 12. The original is removed from the photocopy apparatus at point 28 and emerges onto receiving platform 29.

After the diazo paper 11 is separated from the original 12, it passes through development chamber 24 into which ammonia vapors are fed from conduit 25. The ammonia vapors are fed through conduit 25 from a suitable source (not shown). The ammonia vapors may be generated by heating at a temperature sufficient to liberate free ammonia gas, such compounds as ammonium carbonate, ammonium bicarbonate, etc. The surface of the diazo sheet 11 will be subjected to the ammonia vapors fed through conduit 25 into chamber 24. When the diazo sheet 11 emerges from chamber 24 onto receiving platform 30 it will be properly developed.

While the apparatus shown is of the contact-exposure type, optical apparatus for projecting an image of the original on the copy paper may be employed in accordance with known techniques in the art. Optical image projection is feasible with the present sensitive and fast diazo process notwithstanding the lesser image intensity generally provided by such apparatus.

Other variations and embodiments will be apparent to those of skill in the art, and it is accordingly desired that the scope of the invention not be limited to those embodiments particularly illustrated or suggested but that the scope of the invention be defined by reference to the appended claims.

What is claimed is:

1. A process for producing a visible positive reproduction of an image pattern which comprises exposing said image pattern and a diazo type sheet to radiation in the visible range of the spectrum, said diazo sheet comprising a support and at least one layer thereon containing a relatively stable diazo compound of the formula

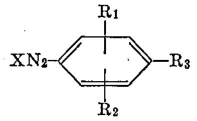

wherein X is an anion, $R_1$ and $R_2$ are each independently moieties selected from the group consisting of H, alkyl, alkoxy, alkyl-mercapto, aryl, aralkyl, halo, carboxy and aryloxy, $R_3$ is a moiety selected from the group consisting

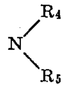

of O—$R_6$ and S–$R_6$ wherein $R_4$ and $R_5$ are each moieties independently selected from the group consisting of H, alkyl, aryl, aryloxy, hydroxy-alkyl, aralkyl, alkylacyl and aroyl and $R_6$ is a moiety selected from the group consisting of alkyl, aryl, aralkyl and alkaryl, at least one azo coupler, and a radiation-sensitive promoter an organic azido compound containing at least one azido group of the formula R—N—N—N wherein R is an organic radical having a carbon group attached to the said azido group, said promoter triggering a chain-reaction type decomposition of said diazo compound in those portions of the diazo type sheet material exposed to said light source and developing the resultant latent image pattern on said diazo type sheet by coupling undecomposed diazo compound with said coupler in said diazo type sheet thereby producing a stable positive reproduction of said image pattern, said coupling being triggered by a shift in pH toward the basic region in said diazo copy sheet.

2. A process according to claim 1 wherein the promoter is selected from the class consisting of triphenylmethyl azide; trinitrotriazidobenzene; and cyanuric triazide.

3. A process according to claim 1 wherein said promoter is present in an amount of about one part by weight per hundred parts by weight of said diazo compound.

4. The process according to claim 2 wherein the promoter is triphenylmethyl azide.

5. A process according to claim 2 wherein the promoter is trinitrotriazidobenzene.

6. A process according to claim 2 wherein the promoter is cyanuric triazide.

7. A process for producing a high speed visible positive reproduction of an image pattern which comprises exposing an image pattern and a diazo copy sheet to radiation in the visible range of the spectrum, said diazo copy sheet comprising a support and at least one layer thereon containing a salt of 1-diazo-4-diethylamino-benzene, at least one azo coupler, and a radiation sensitive promoter an organic azido compound having at least one azido group of the formula R—N—N—N wherein R is an organic radical having a carbon group attached to the said azido group which can trigger a chain reaction type decomposition of said diazonium salt through an electronic change process initiated by the absorption of a quantum of light by said promoter, and developing a positive image of the original image pattern on said diazo copy sheet by coupling any undecomposed diazonium salt with said coupler, said coupling being triggered by a shift in pH toward the basic region in said diazo copy sheet.

8. A process according to claim 7 wherein said shift in pH results from exposure of said diazo copy sheet to ammonia vapors.

9. A process according to claim 8 wherein the azide is present in said diazo copy sheet in an amount of about one part by weight per hundred parts by weight of the diazonium salt.

10. A radiation-sensitive diazo copy sheet comprising a support and at least one layer thereon containing a relatively stable diazo compound of the formula

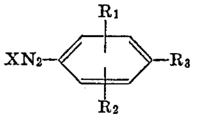

wherein X is an anion, $R_1$ and $R_2$ are each independently moieties selected from the group consisting of H, alkyl, alkoxy, alkylmercapto, aryl, aralkyl, halo, carboxy and aryloxy, $R_3$ is a moiety selected from the group consisting of

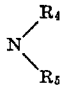

O—$R_6$ and S-$R_6$ wherein $R_4$ and $R_5$ are each moieties independently selected from the group consisting of H, alkyl, aryl, aryloxy, hydrooxy-alkyl, aralkyl, alkylacyl and aroyl and $R_6$ is a moiety selected from the group consisting of alkyl, aryl, aralkyl and alkaryl, at least one azo coupler, and a radiation-sensitive promoter containing at least one azo coupler, and a radiation-sensitive promoter an organic azido compound containing at least one azido group of the formula R—N—N—N wherein R is an organic radical having a carbon group attached to the said azido group, said promoter being capable of triggering a chain reaction type of decomposition of said diazo compound or salt thereof through an electron exchange process.

11. A diazo copy sheet according to claim 10 wherein the azide compound is cyanuric triazide.

12. A diazo copy sheet according to claim 10 wherein the azide is triphenylmethyl azide.

13. A diazo copy sheet according to claim 10 wherein the azide is trinitrotriazidobenzene.

14. A diazo copy sheet according to claim 10 wherein said promoter is present in said diazo copy sheet in an amount of about one part by weight per hundred parts by weight of said diazonium salt.

15. A diazo sheet according to claim 10 wherein said promoter is sensitized with an organic dye.

References Cited

UNITED STATES PATENTS

| | | | |
|---|---|---|---|
| 2,027,229 | 1/1936 | Hinman | 96—91 |
| 2,245,628 | 6/1941 | Von Poser et al. | 96—91 |
| 2,659,672 | 11/1953 | Leuch | 96—91 XR |
| 3,062,650 | 11/1962 | Sagura et al. | 96—49 XR |
| 3,046,113 | 7/1962 | Schmidt et al. | 96—91 XR |
| 3,046,124 | 7/1962 | Schmidt | 96—91 XR |
| 3,288,608 | 11/1962 | Coutaud et al. | 96—91 XR |
| 3,365,293 | 1/1968 | Haefeli et al. | 96—75 |

FOREIGN PATENTS

| | | |
|---|---|---|
| 854,354 | 1/1940 | France. |
| 906,406 | 4/1954 | Germany. |

OTHER REFERENCES

Dinaburg, M. S., "Photosensitive Diazo Compounds," 1964, pp. 22–29 and 47.

Saunders, K. H., "The Aromatic Diazo Compounds," 2nd ed., 1949, pp. 357–377.

Landau et al., "The Journal of Photographic Science," vol. 13, June 1965, p. 145.

Kosar, J., "Light-Sensitive Systems," J. Wiley & Sons, N.Y., 1965, pp. 330, 336, 342.

NORMAN G. TORCHIN, Primary Examiner

C. BOWERS, Assistant Examiner

U.S. Cl. X.R.

96—91